(12) United States Patent
Biver et al.

(10) Patent No.: US 7,597,442 B2
(45) Date of Patent: Oct. 6, 2009

(54) POLARIZING OPHTHALMIC LENS ADAPTED TO A WEARER'S EYE/HEAD BEHAVIOR

(75) Inventors: Claudine Biver, Charenton-le-Pont (FR); Guillaume Giraudet, Charenton-le-Pont (FR); Sylvette Maisonnier, Auzay (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 0 days.

(21) Appl. No.: 12/067,854

(22) PCT Filed: Sep. 19, 2006

(86) PCT No.: PCT/FR2006/002145

§ 371 (c)(1),
(2), (4) Date: Mar. 24, 2008

(87) PCT Pub. No.: WO2007/036626

PCT Pub. Date: Apr. 5, 2007

(65) Prior Publication Data

US 2008/0252846 A1    Oct. 16, 2008

(30) Foreign Application Priority Data

Sep. 29, 2005    (FR) .................... 05 09939

(51) Int. Cl.
*G02C 7/02* (2006.01)
(52) U.S. Cl. .................... 351/177; 351/209; 351/44; 351/49; 351/163
(58) Field of Classification Search ............... 351/177
See application file for complete search history.

(56) References Cited

U.S. PATENT DOCUMENTS

| 2,301,126 | A | 11/1942 | Kriebel |
| 2,334,446 | A | 11/1943 | Serrell |
| 3,211,047 | A | 10/1965 | Heimberger |
| 3,838,913 | A | 10/1974 | Schwarz |
| 5,142,411 | A | 8/1992 | Fiala |
| 5,252,997 | A | 10/1993 | Christenbery et al. |
| 2004/0046927 | A1 | 3/2004 | Montgomery |
| 2005/0099588 | A1 | 5/2005 | Helpern et al. |
| 2007/0103641 | A1 | 5/2007 | Bonnin |
| 2007/0146574 | A1 | 6/2007 | Giraudet |
| 2007/0177099 | A1 | 8/2007 | Begon et al. |

FOREIGN PATENT DOCUMENTS

| DE | 10237684 | 3/2004 |
| FR | 887644 | 11/1943 |
| FR | 2736444 | 11/1943 |
| FR | 2722581 | 1/1996 |
| FR | 2868553 | 10/2005 |
| FR | 2868554 | 10/2005 |
| FR | 2863857 | 6/2006 |
| WO | WO2005/070284 | 8/2005 |
| WO | WO2005/098520 | 10/2005 |
| WO | WO2005/101099 | 10/2005 |

*Primary Examiner*—Jessica T Stultz
(74) *Attorney, Agent, or Firm*—Occhiuti Rohlicek & Tsao LLP

(57) ABSTRACT

The invention relates to a method for producing a polarising ophthalmic lens adapted to the eye/head behaviour of the wearer thereof and to said lens. The inventive ophthalmic lens comprises several areas associated to differently oriented polarising filters. The size and position of at least certain areas are determined according to the lens wearer's eye/head behaviour.

12 Claims, 3 Drawing Sheets a         b         c

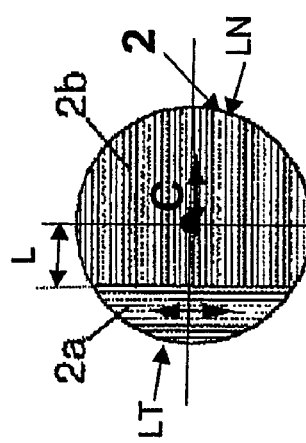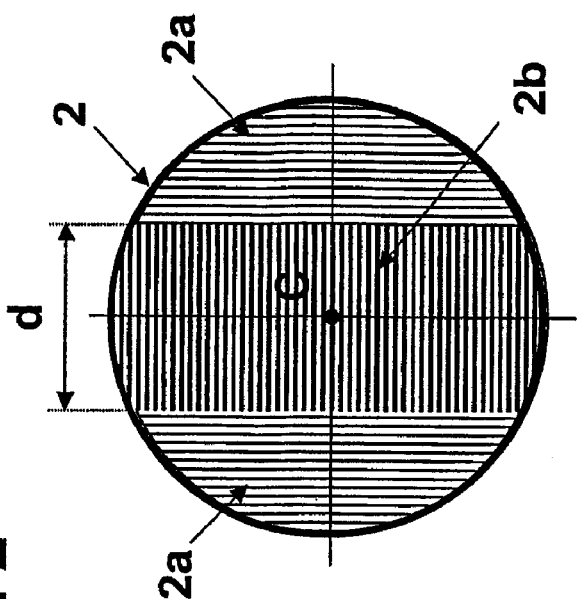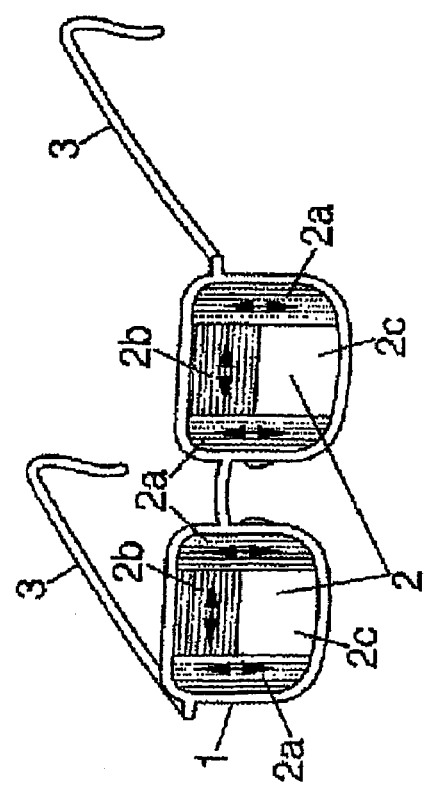

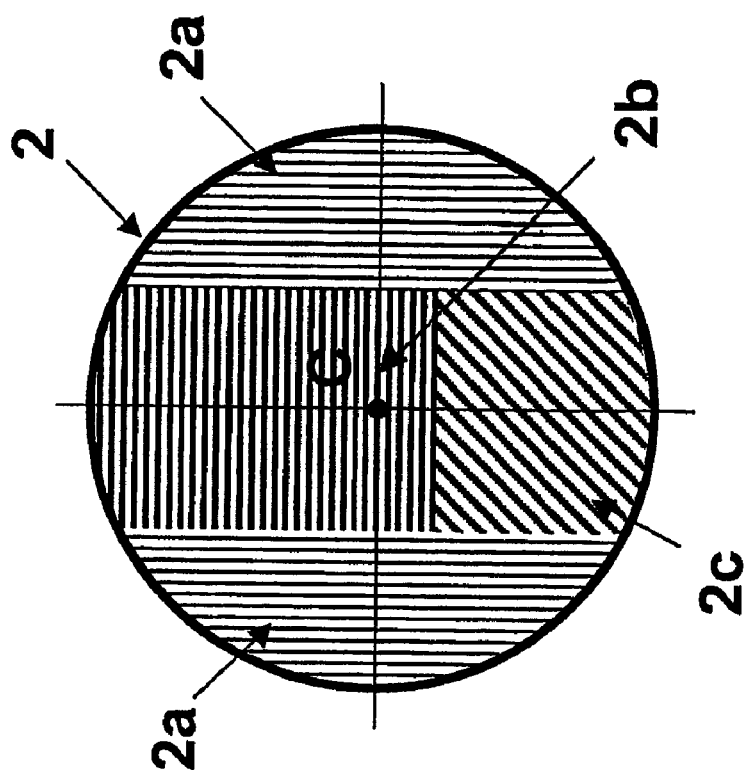
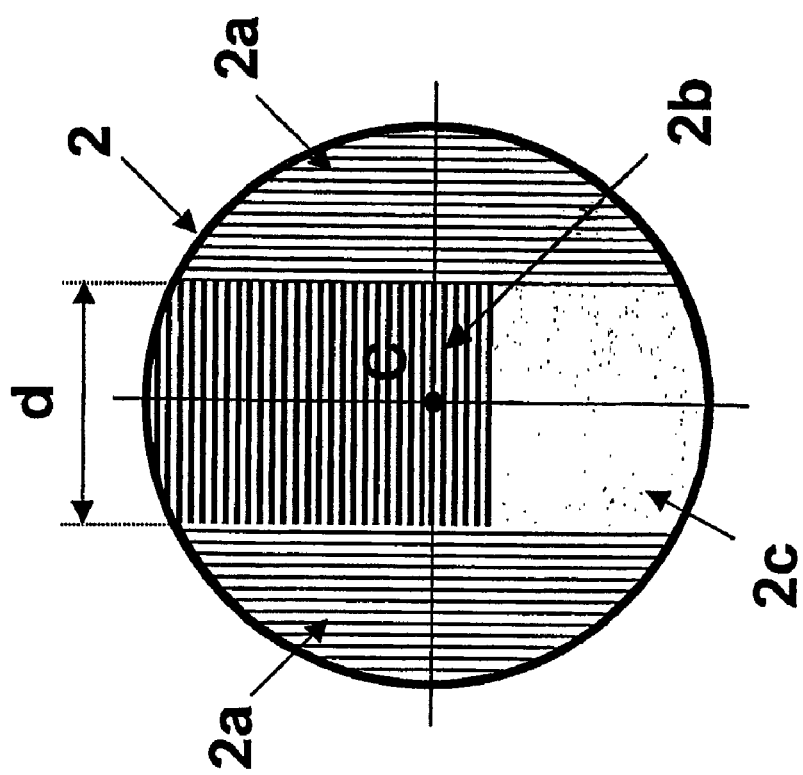

POLARIZING OPHTHALMIC LENS ADAPTED TO A WEARER'S EYE/HEAD BEHAVIOR

CROSS-REFERENCE TO RELATED APPLICATIONS

This application is being filed as a U.S. National Stage under 35 U.S.C. 371 of International Application No. PCT/FR2006/002145, filed on Sep. 19, 2006, which claims the benefit of French Application No. 0509939, filed Sep. 29, 2005, the contents of which is hereby incorporated by reference in its entirety.

BACKGROUND OF THE INVENTION

The present invention relates to a process for producing a polarizing ophthalmic lens which is adapted to the eye/head behavior of a wearer of this lens. It also relates to the lens itself, which comprises zones associated with polarizing filters having different orientations. These zones are determined as a function of the wearer's eye/head behavior.

Natural light is unpolarized: the electromagnetic waves of which it is composed vibrate in all directions. David Brewster, from 1811 onward, demonstrated that for a certain incidence, monochromatic light which is reflected on a transparent surface is 100% polarized. Brewster's law stipulates that the direction of polarization of the reflected wave is parallel to the reflection plane. Thus, the reflection of light on a horizontal plane is polarized horizontally. Polarizing ophthalmic glass has been designed in response to these physical properties of reflective light. Glass whose direction of polarization is horizontal selectively filters the light rays which are derived from the reflection on horizontal transparent surfaces. This glass is particularly effective for eliminating undesirable reflections off bodies of water, off flooring surfaces, off sand or off snow. Nevertheless, horizontal reflective surfaces do not form the majority of the potential sources of glare. Thus, light which is reflected off the window panes of a building or a car is, contrary to the preceding case, vertically polarized.

Certain characteristics of the landscape present in the field of vision of a person are particular to an urban environment. The urban environment has, in particular, numerous vertical reflective surfaces, such as, for example, the glazing panels of buildings. These vertical walls generate reflections whose intensity may be sufficient to cause glare. Such glare is a source of discomfort, but it may also be a source of danger in certain circumstances. This is especially the case for a driver of an automotive vehicle or of a motorbike, for example.

When an individual visually explores his environment, his eyes and his head move in order to guide his gaze to the area of interest. The spatial and time coordination of the eye and head movements has been the subject of numerous research projects. In particular, document FR 2 863 857, in the name of the Applicant of the present patent application, describes a process for measuring the amplitude of the eye and head movements of an ophthalmic lens wearer. It appears that the strategy used for exploring his environment is specific to each individual. When a target is presented in the peripheral visual field, the relative participation of the head and the eyes varies from one subject to another: for certain people, who are called "head movers", the major part of the movement will be carried out by the head; for other people, who are called "eye movers", the eyes will be mainly used to bring the gaze to the target (Afanador, et al., 1986; Fuller, 1992). The propensity to move the head or the eyes most is measured by a gain obtained by dividing the angular deviation of the head by the angular eccentricity of the target. A gain of 1 means that the observer has not moved his eyes and that all the movement necessary to place the gaze on the target was carried out by the head; this is then a subject of the "head mover" type. A gain of 0 characterizes, on the other hand, an "eye mover" observer. But individuals are not distinguished by the two "head mover" vs "eye mover" categories. This is because there is a continuum of behaviors between the two extreme behaviors described previously (Fuller, 1992).

One object of the present invention is to provide a customized protection of the visual function of an ophthalmic lens wearer, against the glare which is caused by reflections of light from reflective surfaces, by taking into account the individual eye/head behavior of each lens wearer.

SUMMARY

To this purpose, the present invention proposes a process for producing a polarizing ophthalmic lens which is divided into several zones associated with polarizing filters having variable respective orientations. The process comprises the following steps, so that the lens is adapted to the eye/head behavior of a wearer of this lens:

/1/ characterizing the relative amplitudes of the respective movements of the wearer's eyes and head;

/2/ as a function of a result from step /1/, defining the zones of the lens which are associated with each polarizing filter orientation; and /3/ fabricating the lens by incorporating into this lens, in each zone defined in step /2/, a polarizing filter having the orientation corresponding to this zone.

According to one preferred embodiment of the invention, step /1/ of the process may comprise a gain calculation for an "eye/head" movement coordination test carried out for the wearer. This gain then constitutes the result which is considered in step /2/ and is equal to the angular deviation of the wearer's head divided by an angular eccentricity of a target looked at by the wearer.

According to the invention, the customization of a protection against glare caused by reflections of light sources off transparent surfaces consists in adapting the dimensions of the various polarization zones as a function of the propensity of the observer to move his eyes or his head most during an exploration of his environment. The general principle of this customization is to provide a central zone that is increasingly wider when the wearer has a tendency to move the eyes. Conversely, this zone will be reduced for a more "head mover" wearer. The size of the central zone, and consequently of the peripheral zones, is therefore not fixed in a single general manner. It varies continuously and is determined as a function of the gain which results from the tests for evaluating the eye-head coordination. This customization has the advantage of optimizing the protection against glare. In order to illustrate the advantage of a customization of the polarization design, the following situation will be considered (cf. FIGS. 1a, 1b and 1c):

a source of glare is present at an eccentricity of 40°;

the polarization orientation of this source is such that it can only be filtered by the peripheral zones of the design;

the polarizing glass has a central zone covering a field of view of ±20°; and a target of interest appears at an eccentricity of 30° in the direction of the source.

If the individual has a "head mover" behavior, he will turn his head 30° to bring his gaze to the target. In this case, the source of glare, which is at no more than an eccentricity of 10°, appears in the central zone and is no longer filtered. The observer is then dazzled (FIG. 1b). If the glass now has a smaller central zone, of ±9° for example, a "head mover" observer is not bothered by the source of glare, the light produced by the latter being filtered out during its passage through the peripheral zone of the glass (FIG. 1c).

The expression "ophthalmic lenses" is understood to mean all lenses of mineral and organic material, variable composition and in variable forms that fit in particular into a spectacles frame for protecting and/or correcting the vision, these lenses being chosen from afocal, single-vision, bifocal, trifocal and progressive lenses.

The expression "usage position of the polarizing ophthalmic lens" is understood to mean the position of this lens when it is fitted in a frame, or in a holder, in front of the eyes of a person conforming to the normal use of the frame or holder, for a vertical position of the person's head. The expression "vertical direction" refers to the gravitational vertical direction. In contrast, a horizontal direction makes an angle of 90° relative to the vertical direction.

The optical center of a lens, as considered in the present patent application, often corresponds with the geometrical center of the lens before machining. More generally, the optical center may be defined in one of the following ways:
- the point which is located on the lens in the middle of two etched areas;
- the point which corresponds to the prism value prescribed for the wearer in distance viewing;
- the point which is indicated by a cross marked on the lens, before the lens is assembled in a frame; or
- the point through which the optical axis of the lens passes, the optical axis being the line which joins the centers of the two surfaces that make up the lens.

The expression "orientation of a polarizing filter" is understood to mean the orientation of the electric field of incident light for which the intensity of the light transmitted by this filter is minimal or zero. Within the context of the invention, only linear light polarizations, or linear light polarization components, will be considered. Natural light is unpolarized, as it has no favored direction of the electric field. On the other hand, light which is reflected from a transparent surface is polarized. The direction of polarization of the reflected wave is parallel to the reflection plane. Due to the presence of a vertically oriented polarizing filter in at least one zone of the lens, light which comes from reflections off vertical walls is attenuated for the wearer looking through this zone. Improved visual comfort results therefrom, especially in an urban environment.

Optionally, the polarizing lens may comprise, in addition, at least one unpolarized zone.

Each zone of a lens produced according to the invention therefore takes into account the wearer's eye/head behavioral parameters. At least two of the zones are associated with light-polarizing filters. The light which passes through the lens is affected differently for the two zones, depending on a polarization direction of this light. The polarizing filter of at least one of the zones is oriented vertically relative to the usage position of the ophthalmic lens, and the polarizing filter of at least one other of the zones is oriented horizontally relative to the usage position of the lens.

The zone which is associated with the vertically oriented polarizing filter is located in a lateral part of the lens, adjacent an edge of the lens relative to its usage position. The lens is then particularly adapted to the common situation of glare in an urban environment, according to which the reflection of a vertical wall is located in a lateral part of the field of vision. Such a situation corresponds, in particular, to the case of a walker or motorist who looks in the direction of a street lined with windows that cause reflections. It also corresponds to the case of a vehicle driver who is subjected to glare due to the reflection of light off vehicles present on his right and/or on his left.

A lens of the first type that may be used for the invention may comprise at least two zones and have the following characteristics:
- the polarizing filter of one of the zones of the lens may be oriented vertically relative to the usage position of the lens. This vertically oriented filter zone is located adjacent a lateral temporal edge of the lens relative to its usage position; and
- the polarizing filter of another zone of the lens may be oriented horizontally relative to the usage position of the lens. This other horizontally oriented filter zone is located adjacent an upper edge of the lens, extends vertically in the direction of a lower edge of the lens, and extends laterally from a lateral nasal edge of the lens in the direction of the lateral temporal edge, up to a distance L which is measured from an optical center of the lens toward the lateral temporal edge.

The distance L is then set in step /2/ between 1 mm and 25 mm. It is equal to 1 mm when a gain equal to 1 is obtained for the wearer in the "eye/head" movement coordination test, and is equal to 25 mm when a gain equal to 0 is obtained for the wearer in the "eye/head" movement coordination test.

Optionally, the distance L may be defined in step /2/ by applying of a continuous linear relationship between the gain which is obtained for the wearer in the "eye/head" coordination test and this distance L.

An example of a lens of the first type is illustrated in FIG. 2. The lens only comprises two zones: a first zone 2a which is associated with a polarizing filter which is oriented vertically relative to the usage position of the lens, and a second zone 2b juxtaposed to the first zone 2a and which is suitable for affecting the light passing through this second zone in a different way to the first zone as a function of the polarization direction of the light. In this example, the peripheral protection which is obtained by zone 2a, zone 2b always being considered as the protection in the central visual field, can only be envisioned for the temporal visual hemifields. It corresponds to the lateral temporal edge (LT) of the lens, as opposed to the lateral nasal edge (LN) of the lens which corresponds to a zone where the nasal visual hemifields occur. The choice of temporal visual hemifields can be justified insofar as the nasal visual hemifields are only slightly exposed to the peripheral disturbances, considering the protection provided by the wearer's nose, and also by the nose of the frame worn.

A lens of a second type that may alternatively be used for the invention may comprise at least three zones and have the following characteristics:
- the polarizing filters of two zones of the lens may be oriented vertically relative to the usage position of the lens. A first one of these zones has a vertically oriented filter which is located adjacent a lateral temporal edge of the lens relative to its usage position, and a second one of these zones having a vertically oriented filter which is located adjacent a lateral nasal edge of the lens relative to its usage position; and
- the polarizing filter of another zone of the lens may be oriented horizontally relative to the usage position of the lens. This other horizontally oriented filter zone is located adjacent an upper edge of the lens, extends vertically in the direction of a lower edge of the lens, and extends laterally continuously over a distance d between the two zones having vertically oriented polarizing filters, the distance d being measured along a straight line passing through an optical center of the lens and spreading out equally on both sides of a vertical straight line passing through the optical center.

The distance d is set in step /2/ between 2 mm and 50 mm. It is equal to 2 mm when a gain equal to 1 is obtained for the wearer in the "eye/head" movement coordination test, and is equal to 50 mm when a gain equal to 0 is obtained for the wearer in the "eye/head" movement coordination test.

Optionally, the distance d may be defined in step /2/ by applying a continuous linear relationship between the gain obtained for the wearer in the "eye/head" coordination test and this distance d.

An example of a lens of the second type is illustrated in FIG. 3. In this case, two peripheral zones 2a are associated with polarizing filters that are oriented vertically and a central zone 2b is associated with a polarizing filter that is oriented horizontally relative to the usage position of the lens. This central zone makes it possible to attenuate the sources of glare derived from the reflection of light off horizontal surfaces, such as bodies of water and wet roads. Such a lens is particularly adapted for comfort whilst driving.

The central zone which is associated with a horizontally oriented polarizing filter extends over a width d ranging from 2 mm for an observer having a "head mover" behavior, obtaining a gain of 1 in the "eye/head" coordination measurement test, up to 50 mm for an "eye mover" observer, that is to say obtaining a gain of 0 in the aforementioned test. These dimensions are measured on a horizontal straight line that passes through the optical center of the lens such as defined previously and on both sides, in an equal amount toward the temporal zone and the nasal zone, of a vertical line that passes through this same point (in other words, the width d of the central zone 2b (FIG. 3) is divided half to the left of the optical center and half to the right of the optical center). These width limits are justified by the following reasons: below 2 mm, the central zone is no longer wide enough to allow an effective covering of the central visual field and the observer will no longer be protected against glare generated by reflections off transparent horizontal surfaces located in front of him (for example, the case of a puddle on the road for an automobile driver). Beyond 50 mm, corresponding to an eccentricity of around 50°, the head is systematically turned and purely "eye mover" behavior no longer exists.

A lens that is used for the invention may moreover comprise an additional zone which is not polarizing or has an obliquely oriented polarizing filter. This additional zone extends laterally continuously in the direction of the vertically oriented polarizing filter zone or zones, is located in a lower part of the lens for its usage position, adjacent the zone having a horizontally oriented polarizing filter, and has an upper limit which passes between the optical center of the lens and a point located 20 mm below this optical center for the usage position of the lens.

This additional zone may not have a polarizing filter.

Alternatively, it may have a polarizing filter whose oblique orientation is between 0° exclusive and 90° exclusive relative to the vertical direction for the usage position of the lens. The oblique orientation of this filter may also be equal to 135° relative to the vertical direction for the usage position of the lens.

According to one improvement of the invention that may be applied when the lens has an additional zone such as defined previously, the upper limit of this additional zone may also be fixed during step /2/ of the process of the invention, so that it passes 7 mm below the optical center of the lens when a gain equal to 0 is obtained for the wearer in the "eye/head" movement coordination test. Alternatively, when a gain equal to 1 is obtained for the wearer in the "eye/head" movement coordination test, the upper limit of the additional zone may be fixed in step /2/ so that it passes 3.5 mm below the optical center of the lens.

The polarizing lens may therefore also have four different zones, or even more. It may especially comprise first and second zones which are each associated with a polarizing filter that is oriented vertically relative to the usage position of the lens, a third zone which is located between the first and second zones and which has a horizontally oriented polarizing filter, and at least a fourth zone, located, for example, under the third zone, in order to affect the light passing through this fourth zone in a different manner to the first, second and third zones. The fourth zone may especially not be polarized or have an oblique polarization direction (FIG. 4).

The invention also proposes a polarizing ophthalmic lens produced in the manner described previously. Such a lens is divided into several zones which are associated with respective polarizing filters, and is adapted to the eye/head behavior of the wearer of this lens.

BRIEF DESCRIPTION OF THE DRAWINGS

Other particularities and advantages of the present invention will appear in the description below of several nonlimiting exemplary embodiments, with reference to the appended drawings, in which:

FIG. 2 represents a polarizing ophthalmic lens comprising a zone (2a) associated with a polarizing filter that is oriented vertically relative to the usage position of the lens, and a second zone (2b) associated with a polarizing filter that is oriented horizontally relative to the usage position;

FIG. 3 represents a polarizing ophthalmic lens comprising two zones (2a) associated with polarizing filters that are oriented vertically relative to the usage position of the lens and that are located adjacent the lateral edges of the lens, and a third zone (2b) associated with a polarizing filter that is oriented horizontally relative to the usage position;

FIG. 4 illustrates a pair of spectacles comprising two polarizing ophthalmic lenses produced according to the invention;

FIG. 5 represents a polarizing ophthalmic lens comprising two peripheral zones (2a) associated with polarizing filters that are oriented vertically relative to the usage position of the lens and that are positioned adjacent a third zone (2b) associated with a polarizing filter that is oriented horizontally and located in the upper central part of the lens, and a fourth nonpolarizing zone (2c) located in the lower part of the lens; and FIG. 6 represents a polarizing ophthalmic lens comprising two peripheral zones (2a) associated with polarizing filters that are oriented vertically relative to the usage position of the lens and that are positioned adjacent a third zone (2b) associated with a polarizing filter that is oriented horizontally and located in the upper central part of the lens, and a fourth zone that has an oblique polarizing filter (2c) located in the lower part of the lens.

DETAILED DESCRIPTION

Figure 1:
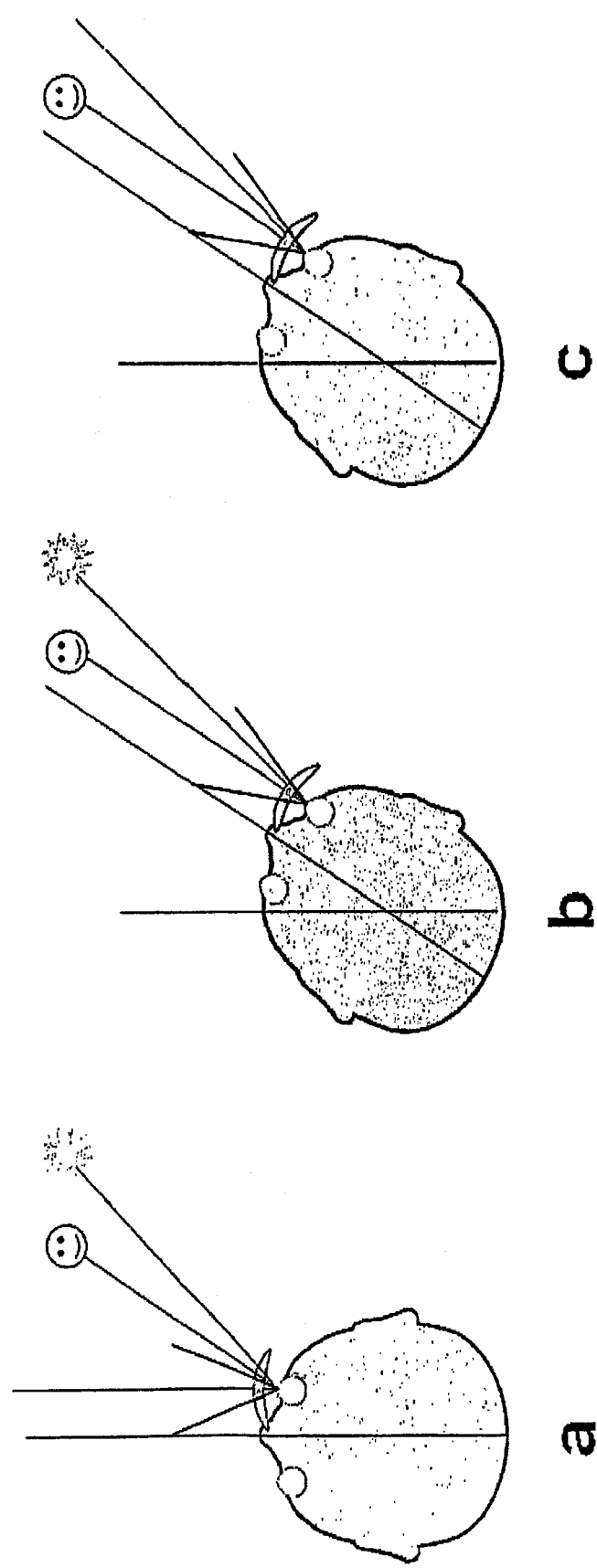
FIG. 1 illustrates the perception of a light source as a function of the "eye/head" behavior of a lens wearer.

With reference to FIG. 4, a pair of spectacles comprises a frame 1 with two arms 3, equipped with two glasses 2. The word "glass" is taken in its usual meaning of curved ophthalmic lens for a pair of spectacles, with no relation to the nature of the constituent material of this glass. A spectacle lens such as considered within the context of the invention may therefore be made of a mineral material, for example based on silicate, or made from an organic material, such as polycarbonate; polyamide; polyimide; polysulfones; polyethylene terephthalate/polycarbonate copolymers; polyolefins, especially polynorbornenes; polymers and copolymers of diethylene glycol bis(allyl carbonate); (meth)acrylic polymers and copolymers especially (meth)acrylic polymers and copolymers derived from bisphenol A; thio(meth)acrylic polymers and copolymers; urethane and thiourethane polymers and copolymers; epoxy polymers and copolymers and episulfide polymers and copolymers.

Within the context of the invention, a spectacle lens may only be a support for polarizing filters. In this case, the two sides of the lens are parallel, so as not to introduce any image distortion. This may also be a lens having an ophthalmic correction function, regardless of the nature of the correction (correction for myopia, astigmatism, hyperopia and presbyopia). This may especially be an afocal, single vision, bifocal, trifocal or progressive lens. The lens may also be associated with other optical functions, such as a solar protection lens or a photochromic lens, etc.

In FIG. 3, the lens 2 is divided into three separate zones. Two zones referenced 2a, associated with vertically oriented polarizing filters, are located laterally, symmetrically on both sides of the optical center C. The borders between the zones 2a and the central zone 2b are rectilinear and vertical. Other border shapes may be envisioned in a substantially equivalent manner. Zone 2b is associated with a horizontally oriented polarizing filter. C denotes the optical center of the lens 2. The distance d represents the total width of zone 2b divided equally on both sides of the center C. The distance d is between 2 and 50 millimeters, that is to say respectively 1 and 25 mm from each side of the center C. It is equal to 50 millimeters for an "eye mover" observer, having obtained a gain of 0 in the eye/head coordination test. It is equal to 2 millimeters for a "head mover" observer having a gain of 1. Moreover, there is a continuous linear relationship between the gain measured and the value of d. A gain of 0.5, which represents a propensity of the wearer to equally turn the head and the eyes during exploration of his peripheral visual environment, then corresponds to a width d of the zone 2b of 26 mm (13 mm from each side of the optical center C). Such a lens is particularly suitable, for example, for a vehicle driver in an urban environment.

The central part of the lens 2 which is located between the two zones 2a may itself be divided into two zones 2b and 2c (FIGS. 5 and 6). Zone 2b is associated with a polarizing filter that is oriented horizontally relative to the usage position of the pair of spectacles. Zone 2c is not associated with any polarizing filter (FIG. 5) or with an obliquely oriented polarizing filter (FIG. 6). Thus, the reflection of the light, off a horizontal reflecting surface, is attenuated or eliminated when it passes through zone 2b. Such light may result from a reflection off the surface of the ground located in front of the spectacle-wearer. In particular, it may be a reflection off the surface of a wet road located in front of a vehicle driver. Zone 2c therefore makes it possible, either not to attenuate polarized light sources (FIG. 5) or to facilitate the perception of sources having a polarization that is oriented obliquely in the opposite way to the orientation of the filter for this zone (FIG. 6).

The vehicle driver wearing a pair of spectacles equipped with lenses conforming to FIG. 5 or 6 is therefore protected both against glare caused by reflections off vertical walls located laterally in his field of vision, and against reflections derived from the surface of a road located in front of him. Moreover, the lower central part of his field of vision, corresponding to zones 2c, is affected either by a nonpolarizing filter that makes it impossible to limit the visibility of the liquid crystal displays which emit polarized light, or by a filter polarized at 135 degrees that guarantees not to have a blanking of the onboard displays which emit light polarized at 0 or at 90 degrees. This enables them to be read by the driver, and also guarantees an increased visual perception of the onboard active matrix displays which produce light polarized at 45 degrees. In order to respond to the various ergonomic arrangements of the dashboards of vehicles that are currently on the market, the inventors have determined that a good compromise is obtained when zone 2c has an upper limit that passes between the optical center and a point located 20 millimeters below this center. The participation of the head in a downward- or upward-looking movement is less important than during horizontal movements. Nevertheless, there is also a certain difference between individuals. The participation of the head in the vertical direction is two times less significant than in the horizontal direction. It is therefore possible to consider that the maximum gain in the vertical direction is 0.5. The main driving components which may be impacted by the polarization orientation properties of the spectacle lens are the liquid crystal displays of the type: speedometers, navigation display devices, etc. These components, considering the requirements of ease and rapidity of access to the information that they give, are rarely located below 20° downward. Consequently, an "eye mover" individual will tolerate a lower position of zone 2c than a "head mover" individual. In the case of the "eye mover" individual, the border placed 7 mm below the optical center is the limit for seeing a display device located 20° downward through zone 2c. By considering that the participation of the head is at most half of the movement, the border will then have to be placed at the highest at 3.5 mm under the optical center.

Multiple variants may be introduced relative to the embodiments described above. In particular, the shape of the borders between the various zones constitutes one element of this variability. These borders may be rectilinear or curvilinear.

Finally, each polarizing filter may be produced according to one of the technologies known to a person skilled in the art, not described here. This may be a filter by absorption of the polarized light along one particular direction or, optionally, a filter by reflection of the polarized light along this direction.

The invention claimed is:

1. A process for producing a polarizing ophthalmic lens divided into several zones associated with polarizing filters having variable respective orientations, the process comprising the following steps so that the lens is adapted to the eye/head behavior of a wearer of said lens:

/1/ characterizing relative amplitudes of respective movements of the wearer's eyes and head;

/2/ as a function of a result from step /1/, defining the zones of the lens associated with each polarizing filter orientation; and /3/ fabricating the lens by incorporating into said lens, in each zone defined in step /2/, a polarizing filter having the orientation corresponding to said zone.

2. The process as claimed in claim 1, wherein step /1/ comprises a gain calculation for an "eye/head" movement coordination test carried out for the wearer, said gain constituting the result considered in step /2/ and being equal to the angular deviation of the wearer's head divided by an angular eccentricity of a target looked at by said wearer.

3. The process as claimed in claim 2, wherein:
the polarizing filter of one of the zones of the lens is oriented vertically relative to the usage position of said lens, said vertically oriented filter zone being located adjacent a lateral temporal edge (LT) of the lens relative to its usage position; and
the polarizing filter of another zone of the lens is oriented horizontally relative to the usage position of the lens, said horizontally oriented filter zone being located adjacent an upper edge of the lens, extending vertically in the direction of a lower edge of the lens, and extending laterally from a lateral nasal edge (LN) of the lens in the direction of the lateral temporal edge (LT), up to a distance L measured from an optical center (C) of the lens toward the lateral temporal edge (LT),
and according to which said distance L is set in step /2/ between 1 mm and 25 mm, said distance L being equal to 1 mm when a gain equal to 1 is obtained for the wearer in the "eye/head" movement coordination test, and being equal to 25 mm when a gain equal to 0 is obtained for the wearer in the "eye/head" movement coordination test.

4. The process as claimed in claim 3, wherein the distance L is defined in step /2/ by applying a continuous linear relationship between the gain obtained for the wearer in the "eye/head" coordination test and said distance L.

5. The process as claimed in claim 2, wherein:
the polarizing filters of two zones of the lens are oriented vertically relative to the usage position of the lens, a first one of said zones having a vertically oriented filter being located adjacent a lateral temporal edge (LT) of the lens relative to its usage position, and a second one of said zones having a vertically oriented filter being located adjacent a lateral nasal edge (LN) of the lens relative to its usage position; and
the polarizing filter of another zone of the lens is oriented horizontally relative to the usage position of the lens, said horizontally oriented filter zone being located adjacent an upper edge of the lens, extending vertically in the direction of a lower edge of the lens, and extending laterally continuously over a distance d between the two zones having vertically oriented polarizing filters, the distance d being measured on a straight line passing through an optical center (C) of the lens and spreading out equally on both sides of a vertical straight line passing through said optical center,
and wherein the distance d is set in step /2/ between 2 mm and 50 mm, said distance d being equal to 2 mm when a gain equal to 1 is obtained for the wearer in the "eye/head" movement coordination test, and said distance d being equal to 50 mm when a gain equal to 0 is obtained for the wearer in the "eye/head" movement coordination test.

6. The process as claimed in claim 5, wherein the distance d is defined in step /2/ by applying a continuous linear relationship between the gain obtained for the wearer in the "eye/head" coordination test and said distance d.

7. The process as claimed in claim 1, wherein an additional zone of the lens is not polarizing or has an obliquely oriented polarizing filter, said additional zone extending laterally continuously in the direction of the vertically oriented polarizing filter zone or zones, being located in a lower part of the lens for its usage position, adjacent the zone having a horizontally oriented polarizing filter, and having an upper limit passing between the optical center (C) of the lens and a point located 20 mm below said optical center for the usage position of the lens.

8. The process as claimed in claim 7, wherein said additional zone (2c) does not have any polarizing filter.

9. The process as claimed in claim 7, wherein said additional zone (2c) has a polarizing filter whose oblique orientation is between 0° exclusive and 90° exclusive relative to the vertical direction for the usage position of the lens.

10. The process as claimed in claim 7, wherein said additional zone has a polarizing filter whose oblique orientation is equal to 135° relative to the vertical direction for the usage position of the lens.

11. The process as claimed in claim 7, wherein the upper limit of said additional zone is set in step /2/ so that said limit passes 7 mm below the optical center (C) of the lens when a gain equal to 0 is obtained for the wearer in the "eye/head" movement coordination test.

12. The process as claimed in claim 7, wherein the upper limit of said additional zone is set in step /2/ so that said limit passes 3.5 mm below the optical center (C) of the lens when a gain equal to 1 is obtained for the wearer in the "eye/head" movement coordination test.

* * * * *